Feb. 2, 1943.  R. C. BENNER  2,309,819
ART OF GRINDING AND POLISHING GLASS AND APPARATUS THEREFOR
Filed April 18, 1941  3 Sheets-Sheet 1
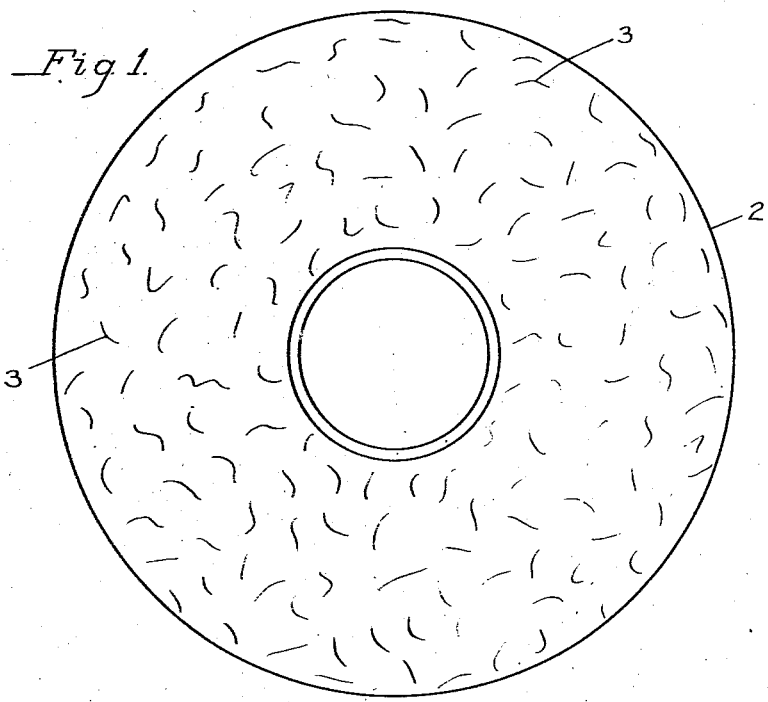
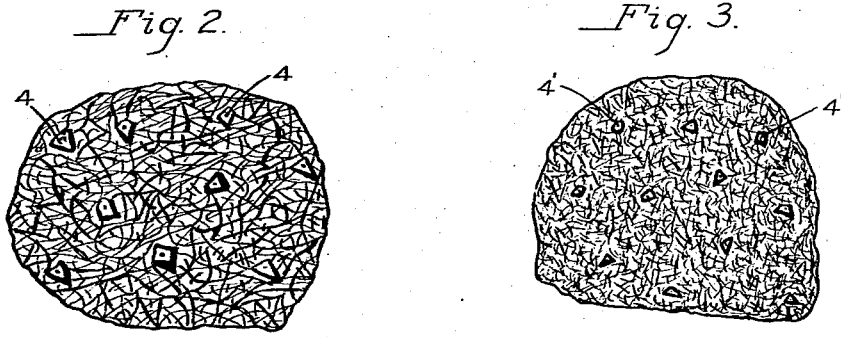
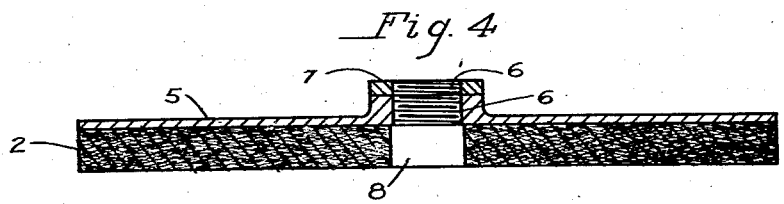
INVENTOR.
RAYMOND C. BENNER.
BY
ATTORNEY.

Feb. 2, 1943. R. C. BENNER 2,309,819
ART OF GRINDING AND POLISHING GLASS AND APPARATUS THEREFOR
Filed April 18, 1941 3 Sheets-Sheet 2

INVENTOR.
RAYMOND C. BENNER.
BY
ATTORNEY.

Feb. 2, 1943.  R. C. BENNER  2,309,819
ART OF GRINDING AND POLISHING GLASS AND APPARATUS THEREFOR
Filed April 18, 1941  3 Sheets-Sheet 3
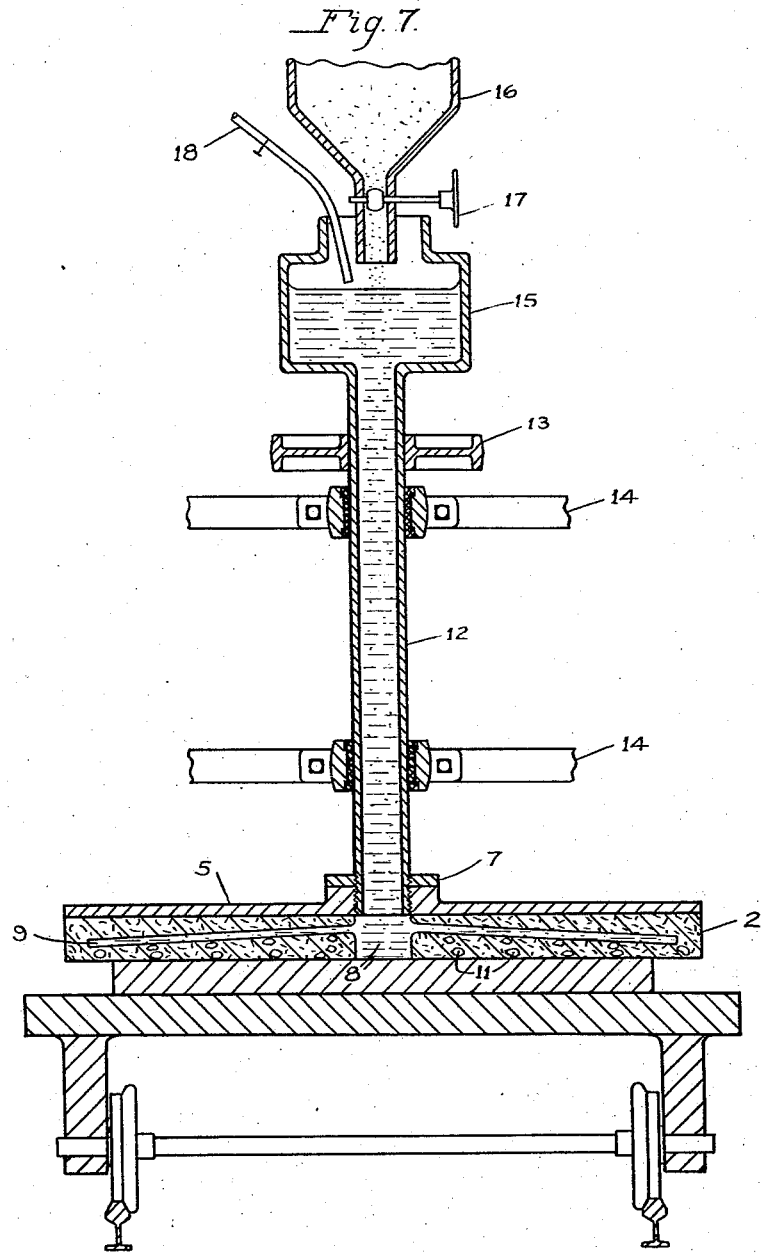
INVENTOR.
RAYMOND C. BENNER.
BY
ATTORNEY.

Patented Feb. 2, 1943

2,309,819

UNITED STATES PATENT OFFICE 2,309,819

ART OF GRINDING AND POLISHING GLASS AND APPARATUS THEREFOR

Raymond C. Benner, Niagara Falls, N. Y., assignor to The Carborundum Company, Niagara Falls, N. Y., a corporation of Delaware Application April 18, 1941, Serial No. 389,137

19 Claims. (Cl. 51—195)

This invention relates to improvements in the art of grinding and polishing glass and to apparatus therefor. While not limited to use on plate glass, it is directly applicable to the manufacture thereof, and can perhaps be most readily understood if described in relation thereto.

This application is a continuation in part of my copending application, Serial No. 278,361, filed June 9, 1939.

In the modern method of manufacturing plate glass in continuous production on a large scale, the molten glass, after having been refined, flows between rollers (usually about 12 inches in diameter and water-cooled), emerging as a relatively flat ribbon or sheet. It then passes through an annealing lehr in which the temperature gradually decreases, this procedure serving to remove the stresses and strains set up in the glass as it was changing from the liquid to the solid condition, and also preventing the development of any strains as the temperature is gradually reduced to atmospheric. The ribbon or sheet leaving the lehr is cut into strips which are then imbedded horizontally by means of plaster of Paris on a series of work tables supported on car trucks operating on two tracks which have been levelled with extreme care. The work tables are arranged end-to-end and are moved forward along the tracks, first beneath a series of rotating machines called grinding heads employing cast iron runners and sand, then beneath a series of machines employing finer sand, emery or fused alumina grain, and finally beneath a series of rotating polishing machines. The cast iron runners are attached to a large rotating spider or head which is somewhat greater in diameter than the width of the glass sheet. These machines grind and polish the upper surface of the sheet. The sheet is then turned over, again embedded on the tables by means of plaster of Paris and passed beneath the same or a second series of grinding and polishing machines to surface the other side of the glass.

This extensive and costly grinding and polishing operation is originally made necessary by the fact that the glass as it comes from the rolls is not truly flat nor of uniform thickness nor does it possess the high degree of brilliance and perfection necessary for the uses to which this type of glass is put. The thickness of the rolled sheet may vary from point to point by as much as 0.03 inch, and there is in addition to this a minor local waviness of the surface which must be overcome if distortion of objects viewed through the glass is to be prevented.

A further reason for grinding is introduced in that the initial grinding is usually done with river sand, which has been roughly screened to take out particles coarser than about 20 mesh. It is generally believed in the industry that a large part of the grinding operations, even through the final polishing, is devoted to the removal of holes, known as sand holes, introduced in the first grinding stage. Even though the the sand for grinding is screened before use, it still contains some irregularly shaped grains as well as oversized particles which in use are sometimes caught endwise between the iron runners and the glass, with the result that distinct pits are gouged into the glass before the particles can free themselves and return to a position in which their effective height is closely comparable to that of their neighbors. These tiny pits, known in the industry as sand holes, must be removed by further grinding in order to produce a high grade glass. Otherwise microscopic depressions are left which are filled with rouge in the later polishing operation to an extent which cannot be removed by mere washing. In addition to the pits there are also relatively coarse scratches made in the glass by the sand before the latter is crushed down in the course of the abrasive action to a stage where it is removed from the machine, roughly classified as to size and returned for use on a finer grinding stage. In the subsequent stages the same difficulty with pits and scratches is repeated on a smaller scale, etc., until the final polishing stage is reached after passing the glass under perhaps 30 grinding heads.

All in all, it is ordinarily necessary to remove up to 0.03 inch of glass from each side of the sheet in producing high grade plate glass. This means that in thin sheets, such as those used for automobiles, up to one-half or even slightly more of the total weight and thickness of the finished sheets is ground away in producing two flat surfaces, free from defects and possessing the requisite brilliance. This not only involves a waste of glass but requires tremendous quantities of abrasive and a great amount of power for grinding. It has been estimated that the energy consumption approaches a kilowatt hour or even more per square foot of glass, and that approximately twice as much sand is sometimes used for grinding as is melted up originally to make the glass, or, expressing it in another way, that the sand used for grinding weighs twice as much as the finished glass. As above noted all this sand is put through a classifier system for size classification one or more times during its use for grinding. Hence the capital investment and the handling cost are both very high.

It is an object of the present invention to reduce these various costs and losses by enabling faster and better finishing with less glass removal, less power consumption, fewer pits and scratches, less abrasive and less handling of abrasive. By the use of my improved method of working, it is also possible to decrease somewhat the number of grinding heads required to produce a given finish.

In my improved apparatus, I use resilient pads in place of at least part of the cast iron runners previously mentioned. Such pads may be made, for example, from the felted fibres of a member of the hemp family, such as sisal, manila or jute, or of other fibrous material. Coarseness of the individual fibres appears to be advantageous rather than otherwise since individual coarse fibres are not so readily damaged as small ones by the abrasive beneath them. However, fine fibres also work well, particularly with the finer abrasive grits. In any case, the fibres are impregnated after felting with a compound such as a solution or dispersion of an elastomer, i. e. rubber or other resilient rubber-like material which may be congealed or vulcanized to a tough, more or less hard but yieldable resilient texture, and the said material is then cured in place. For use with the finer grit abrasives particularly, it is better if the pores between the fibres are not completely filled with rubber but are left as interconnected openings.

The method of producing such pads is not a part of the present invention but is more fully described in a copending application Serial No. 56,707, filed December 30, 1935, in which I am a joint applicant with others. See U. S. Patent No. 2,167,037.

Non-fibrous pads of an elastomer, i. e. rubber or synthetic rubber-like materials such as copolymers of butadiene with other polymerizable compounds, such as acrylic acid nitrile or styrene, or polymers of chloroprene may also be used within the scope of my invention. The rubber-like material composed of copolymers of butadiene with acrylic acid nitrile is sold under the trade names "Ameripol" and "Hycar"; that composed of polymers of chloroprene is sold under the trade name "Neoprene." These may advantageously be made by methods well known in the rubber industry with a resilience comparable to the tread of an automobile tire or somewhat softer and may if desired be reinforced with cotton webbing, etc. wetting the pad behind the working face in the same way as an automobile tire. Such tire-like pads have been used to advantage in the second phase of the grinding operation (where emery is often used following the initial sand grinding). When so used it has been found possible to use relatively coarse sand particles rather than emery in conjunction with these rubber pads, thus securing a rapid cutting action, but without producing objectionably deep scratches such as would be made with runners of the old type with sand of the same coarse type. With the rubber pads, the sand at this stage may be as coarse or coarser than that used in the original grinding stage with iron runners. The working face of my resilient pads may be smooth or may consist of alternate elevated lands and intervening valleys and the abrasive grain may be supplied through an axial opening or otherwise as may be most convenient. The pads should in general be rotated around their individual axes and also revolved as units in a planetary orbit around another axis which is common to two or more pads, while the pads are supported on the surface of the glass passing beneath them. The pressure of the pads on the glass may be controlled by adjusting weights resting upon the backs of the pads or their driving mechanism, the grinding unit being so arranged as to permit free vertical movement of the pads above the glass along the direction of their axes.

While it is within the scope of my invention to use such solid resilient pads at any stage, I find them of particular advantage with the coarser particles of abrasive. In the case of finer grit sizes the irregularly porous working face, which is characteristic of the fibre pads, is distinctly advantageous in furnishing clearance for the abraded particles of glass as well as for providing more positive impulsion for the abrasive grains during the grinding and polishing operations. Moreover, the random and irregular orientation of the felted fibres as compared with the fibres of a woven fabric appears to reduce the tendency to form a repetitive pattern on the glass, so that the felted fibres are preferable to woven ones. Fibrous and non-fibrous pads may be used on successive grinder heads in any desired sequence. Either fibrous or non-fibrous pads may be reinforced internally with woven fabric such as is used in automobile tires to increase the stiffness of the pads.

The pads of whatever type are attached to the bottoms of relatively large substantially vertical spindles by "Vulcalock" cement or other suitable adhesive. Each grinding or polishing head is normally furnished with several such spindles which revolve about the main axis of the grinding head as well as turning on their own individual axes. Their path of travel is such that as they reach either side of the table supporting the glass a number of them extend several inches beyond the glass, thus imparting to it a satisfactory surface for its entire width. If the pad used is of larger diameter than the spindle face to which it is attached, a degree of added yieldability is secured which is particularly useful in case the spindle is not vertical but slightly tipped sidewise.

The pads may be simply substituted for some or all of the cast iron runners, and abrasive fed to the surface of the glass being ground in the usual manner. I have, however, found it generally advisable to feed the abrasive grain together with a considerable volume of water either axially under the center of the pad, from which it works its way outward during use or to feed the abrasive and water into the pores of the pad, through which they flow into contact with the glass. A slight cavity or cup beneath the central part of the pad is sometimes used in this connection although it does not appear strictly necessary.

When mounted, the pads should be free to rotate about their individual axes as the grinding head revolves. This individual rotation may be positively provided by driving the supporting spindles or may be induced by the traverse of the grinding head across and along the glass. The positive drive is somewhat more effective, but complicates the grinding head. In either case, it is desirable that the pad be free to rise and fall with major variations in glass thickness and that it be kept pressed against the glass when in use by a positive pressure of around a pound or so per square inch.

I have found it desirable to use pads of different degrees of hardness, depending upon the size and nature of the abrasive being used. The different degrees of hardness are obtained by varying the composition of the impregnating matrix by use of carbon black and similar fillers in the rubber mix as well as by the use of various accelerators and vulcanization practices, all of which means are familiar to skilled rubber workers. The finer the abrasive, the stiffer the pad which may be advantageously used. Likewise, the softer the abrasive (Mohs' scale of hardness), the harder or stiffer the pad advantageously may be made. Emery for instance should be used with a softer pad than sand of the same grit and silicon carbide with a still softer one. Soft pads tend to give less scratches than stiffer ones, but wear out more rapidly and take slightly more power. Hence I prefer to use the hardest pad in each case which I can without scratching the work.

By the use of a sufficiently soft pad it has been found possible to secure a distinctly smoother glass surface using coarse grit sand than it has hitherto been possible to obtain with an iron runner even when much finer grit abrasive is used. In this way an increased rapidity of cut is imparted by the coarser grains and at the same time a surface is produced which requires less subsequent grinding and polishing. This effect is very marked. An increase in diameter of the abrasive particles of five to tenfold is satisfactory and produces a smoother surface essentially free from sand holes and scratches. This, moreover, requires the use of only one-half as much energy or less.

In order to secure this desirable effect, it is necessary that the pads be sufficiently soft to permit an abnormally large abrasive particle to sink instantaneously into the pad rather than being driven into the glass where it would produce a pit or scratch. This result is obtained when the hardness of the pad is such that a single grain pressed against the face of the pad can be forced substantially flush with the surface thereof without damage to the pad and not stick in place when the pressure is removed. The same result can be obtained with a relatively stiffer and harder pad when the felted fibers have not been too closely compressed together and the voids between them have not been completely filled with rubber compound in the course of manufacture.

The unusually efficient action of the abrasive used in conjunction with such resilient pads appears to be due to its action being what may be described as a cross between the grinding action of fixed abrasive grains and that of loose grains of the type designated as lapping. The abrasive particles temporarily seat themselves in the pores and indentations of the pad or are lodged in front of one of the fibres, where they are held sufficiently firmly to make them act as efficient cutting points or edges. They are not, however, so firmly seated as to remain in place until they are worn down smooth, but soon tip over to present a fresh cutting edge to the work, and so continue to utilize their full abrasive ability much longer than does either a solidly attached particle or a freely rolling particle under a non-resilient lap. At any given moment some particles are thus fixed while others are in process of readjusting their orientation with respect to the work and the pad.

In pads which I have used to advantage with abrasives from perhaps 40 to 100 mesh, the diameter of the individual fibres has been equal to or larger than the diameter of the individual abrasive particles, and the average distance between adjacent fibres measured in a plane parallel to the face of the pad has been at least five times the average diameter of the fibres similarly measured. Moreover, there have been interconnecting pores throughout the pad of sufficient size to permit the free movement of water and extremely fine solid particles through these pores. In the case of very fine abrasives, these ratios are no longer particularly significant since the abrasive granules are far smaller than any normally available fibres. My invention is not, however, broadly limited to the use of pads of this texture as harder and denser pads also may be used, particularly with fine grits.

As previously stated, it is desirable in using two types of abrasive of equal particle size but different inherent hardness that a harder pad be used with the softer abrasive, the object in each case being to use as hard a pad as is found consistently to give freedom from scratching of the glass. Similarly, I have found in working with two different glass compositions having different degrees of hardness that it is in general desirable to use a somewhat softer pad on the harder glass, the abrasive being the same.

The improved polishing apparatus which has been desscribed above is illustrated in the accompanying drawings in which:

Figure 1 shows the working surface of a fibrous polishing pad when viewed from a point on the axis of rotation;

Figure 2 is a fragmentary enlarged view of the working surface of a pad of the type shown in Figure 1, the structure being relatively loose, and coarse abrasive particles adapted for use therewith being indicated on the front of the pad;

Figure 3 is a view similar to Figure 2, but illustrating a pad of closer structure for use with smaller abrasive particles;

Figure 4 is a sectional elevation of the pad shown in Figure 1 and of a mounting for use in attaching the pad to a driving shaft;

Figure 7 is an elevation partly in section showing operating mechanism for a polishing pad and abrasive feeding means.

Figure 6:
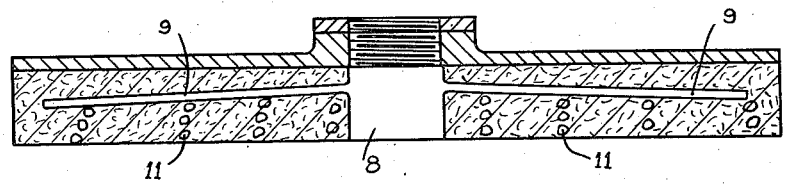
Figure 6 is an axial section of a porous polishing pad, ducts and pores being shown on a relatively enlarged scale to indicate paths for the circulation of water and of abrasive particles through the pad.

Referring to the drawings in more detail, Figure 1 shows the working surface of a pad 2 made of felted fibres 3 which were impregnated with a rubber solution or dispersion. The impregnated fibres can be formed into a circular disk, for example, by pressing them in a circular mold and vulcanizing the rubber in situ by heating the mold. The spaces between the felted fibres are not completely filled with rubber, and pore spaces are distributed throughout the somewhat spongy mass of the polishing pad. In Figure 2 the reference numeral 4 is employed to indicate relatively coarse abrasive particles for use with the pad of relatively loose structure shown in Figure 2. In Figure 3 the structure of a second polishing pad is indicated as being relatively closer than that shown in Figure 2. The abrasive particles 4' indicated in Figure 3 are therefore relatively finer than the corresponding particles 4 in Fig. 2.

The mounting of a polishing pad on its backing or immediate support is indicated in Figure 4. The polishing pad 2 is secured to the support 5 by means of a cement composed, for example, of a modified rubber which is strongly adherent to metal, such as a modified rubber obtainable under the trade name "Vulcalock." The support 5 has a threaded central opening 6 to which a hollow driving shaft may be connected as indicated in Figure 7. A lock-nut 7 is used to reinforce the attachment of the support 5 to the driving means. Water and abrasive particles are supplied to the enlarged portion 8 of the central opening 6 as indicated in Fig. 7. From the opening 8 water and abrasive are carried outwardly and downwardly to the pores and onto the working surface of the pad.

Possible paths of circulation of water and abrasive particles are indicated in Figure 6 where the channels 9 and the pores 11 are indicated on a relatively much enlarged scale for the sake of clearance.

It should be understood that in porous pads of the type described in this application, the channels and pores may be irregular shaped paths between the felted fibers as well as specially formed regular shaped channels such as those shown as 9 and 11 in this drawing.

In Figure 7 the hollow shaft 12 carries a pulley wheel 13 which can be driven by means of a belt and a motor which are not shown. The hollow shaft is rotated in bearings carried by the members 14. The upper end of the hollow shaft has an enlargement 15 into which abrasive particles are dropped from a hopper 16, the rate of flow being regulated by means of a valve 17. Water is supplied at a regulated rate through a hose 18. The water and abrasive particles are mixed up together by the action of centrifugal force in the rotating chamber 15 and the mixture descends into the chamber 8 from which it flows through and under the porous pad 2.

Figure 5:
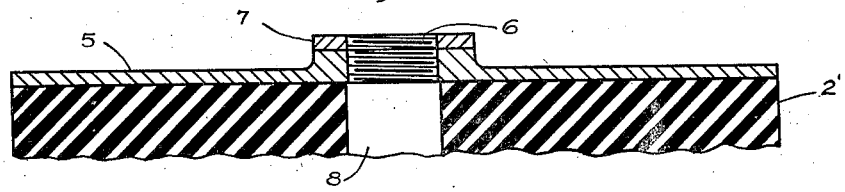
Figure 5 is a sectional elevation similar to Figure 4 but showing a non-fibrous rubber pad.

Figure 5 illustrates a polishing pad 2' whose working portion is composed of resilient but substantially non-porous rubber. The rubber is sufficiently resilient to allow abrasive particles to sink into the rubber so that the particles do not cut deeply into the glass. The particles can roll about somewhat in the rubber support so that they become worn on comparatively large portions of their surfaces. The cushioned support reduces the tendency of the sand grains to break down into pieces with sharp corners. Hence the tendency to scratch and gouge the glass is reduced.

As an alternative to the plain flat and waffle type pads above-mentioned, the working surface of the rubber pad can be made somewhat irregular, that is it may contain a number of depressions of slight curvature. Such undulating hollows in the working surfaces assist in holding water and the abrasive particles between the resilient rubber pad and the glass surface which is being ground.

Figure 8:
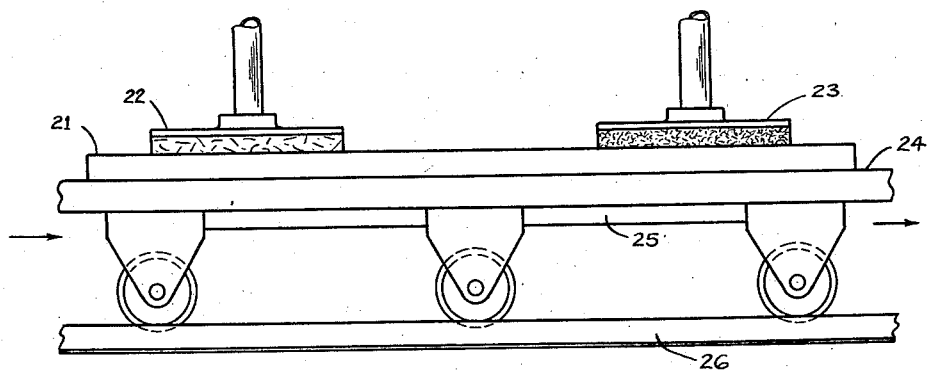
Figure 8 is an elevation showing operating mechanism for passing a sheet of glass first under a relatively coarse pad and then under a relatively fine pad.

In Figure 8 there is shown mechanism for moving a plate of glass 21 first under a rotating pad 22 in which the texture of the pad and the sizes of the abrasive particles are comparatively coarse as in the case of Figure 2. The glass plate passes from under the pad 22 and comes later under the rotating pad 23 where the texture of the pad and the sizes of the abrasive particles are comparatively fine as indicated in Figure 3. The glass plate is imbedded in a table 24 which is carried at a slow rate under the polishing pads. The table 24 is supported on a movable truck 25 which runs on rails such as that indicated at 26.

A considerable difference between the process of the present invention and the standard process using iron runners results because the rubber pads of the present process are not sufficiently hard to cause crushing of the abrasive particles. Hence these particles do not break down as fast as in the older process and may be used more times per particle (i. e., less total abrasive is required). This relieves the pressure on the classifier units and permits time to be devoted to a more complete and effective classification of the abrasive for further use. The breakdown of such particles as are reduced in size is moreover in general a mulling action by which projecting points are removed rather than the diametrical shattering of the particle. Hence the resultant abrasive is more uniform in shape and size and less harsh in its cutting action than the abrasives of the old process.

A further advantage of the use of these resilient pads is that harder and consequently more efficient abrasives may be used than formerly. For example, fused alumina and silicon carbide grains may be used to replace the sand formerly employed. Similarly my new process makes possible the replacement of rouge, commonly used for polishing in some plants and which is of course a comparatively soft material, by a harder abrasive such as sand, fine emery or fine fused alumina, any one of which performs the work more rapidly and efficiently. This permits a substantial reduction in the number of grinding heads used and, more or less directly in proportion thereto, a reduction in the amount of power required, to an extent which may amount to as much as 40% of the present total power input. It has been discovered that the grain size of these harder abrasives may actually be larger than the grains of the softer material and yet, owing to the resilient pad, a surface relatively freer from scratches is produced with the expenditure of less time and energy.

It is thus apparent that my application of resilient pads to the grinding and polishing of glass yields advantages in many directions. While I have described it in connection with the manufacturer of flat glass, it is obviously also applicable to the formation of other glass surfaces.

I claim:

1. In an apparatus for finishing glass surfaces, a pad having pore spaces in the face thereof, the pores being separated by fibrous material with an elastomer bond and said pad being of a resilient nature, and loose granular abrasive material between the pad and the glass, the diameters of the individual granules being less than the widths of the pores.

2. In the finishing of glass surfaces, the process which comprises grinding the said surfaces with a succession of resilient pads under which loose granules of abrasive are applied, the coarser abrasive particles being used with more yieldable pads and the finer abrasive particles being used with less yieldable pads.

3. In an apparatus for finishing glass surfaces, a series of resilient pads of different degrees of softness, abrasive granules of progressively different sizes and hardnesses between said pads and the glass, the pads for use with the coarser granules being softer than those for use with finer ones and the pads for use with harder granules being softer than those for use with less hard granules of approximately equal size, means for attaching the back of each resilient pad to a support, and means for moving each pad so that it rubs the underlying abrasive particles along the surface of the glass which is being ground.

4. In an apparatus for finishing glass surfaces, a porous resilient pad comprising felted fibres in an elastomer matrix, said pad having an irregularly porous working face and being rotatable about an axis, and means for introducing abrasive powder and water between the pad and the glass surface in proximity to the axis.

5. In the finishing of glass surfaces, the process which comprises wiping unattached particles of abrasive over said surface beneath a porous resilient pad of felted fibrous material in a matrix of an elastomer.

6. In an apparatus for surfacing glass, a porous resilient pad comprising felted fibres in an elastomer matrix and unattached grains of abrasive between said pad and the glass.

7. In the surfacing of glass, the method which comprises applying abrasive to the surface thereof by flowing said abrasive with water admixed therewith through the pores of a resilient porous pad and thereafter wiping said abrasive over the surface of the glass by impulsion from said pad.

8. In the process of surfacing glass and the like, the method which comprises rubbing abrasive granules against the glass by impelling said granules with a moving porous resilient pad containing felted fibres bonded with a vulcanized elastomer against which some of the particles are momentarily firmly positioned, and permitting said abrasive granules to continually reorient their positions with respect to the work and the impelling pad.

9. In the process of finishing glass surfaces by grinding said surfaces with a series of loose abrasive granules of progressively differing coarseness, said granules being impelled by resilient pads, the steps which comprise supplying coarse abrasive grain to relatively soft pads and supplying fine abrasive grain to less resilient pads of closer structure for successive grinding operations on the glass.

10. In the process of finishing glass surfaces by grinding said surfaces with a series of loose granules of progressively differing hardness, said granules being impelled by resilient pads, the steps which comprise supplying relatively hard abrasive granules to resilient pads of loose structure and supplying abrasive granules of less hardness to stiffer pads of closer structure for successive grinding operations on the glass.

11. In an apparatus for finishing glass surfaces, a grinding pad comprising an annulus of resilient elastomer mounted on a thin metal backing, abrasive granules and a dispersing liquid in the central hollow of the annulus, the resilience of the annulus being of such a character that the annulus can enclose the major portion of each abrasive particle when the pad is subjected to grinding pressure, and means for rotating said grinding pad in contact with a glass sheet.

12. In the finishing of glass surfaces the process which comprises grinding the said surfaces with a succession of non-fibrous resilient elastomer pads under which loose granules of abrasive are applied, the coarser abrasive particles being used with the more yieldable pads and the finer abrasive particles being used with less yieldable pads.

13. In an apparatus for finishing glass surfaces, a grinding pad comprising a resilient annulus of elastomer material, said pad having a working surface comprising elevated lands and intervening valleys and being rotatable about an axis, and a supply of abrasive particles and liquid in the central opening of the annulus.

14. In the finishing of glass surfaces, the process which comprises wiping unattached particles of abrasive over said surface beneath a non-fibrous pad composed of resilient elastomer whose working surface is made slightly irregular to aid in holding the abrasive particles between the pad and the glass.

15. In an apparatus for surfacing glass, a non-fibrous grinding pad comprising resilient elastomer whose working face is provided with slight irregularities, and unattached abrasive particles between said pad and the glass.

16. In the surfacing of glass and the like, the method which comprises rubbing abrasive particles against the glass by impelling said granules with a rotating resilient elastomer pad in which some of the particles are momentarily firmly positioned, and permitting said abrasive granules to continually reorient their positions with respect to the glass and the impelling pad.

17. In the finishing of glass surfaces, the process which consists of wiping unattached particles of abrasive over said surface beneath a revolving pad of resilient elastomer while the said surface is continuously moved in a linear direction beneath said pad.

18. In the finishing of glass surfaces, the process which comprises abrading the glass surface with sand of progressively increasing fineness under a series of metal runners to produce a primary abraded surface and thereafter smoothing said surface preliminary to polishing by further abrasion with sand under resilient pads of an elastomer.

19. In an apparatus for surfacing glass, a revolving polishing pad of resilient elastomer, means for positioning a glass sheet under said pad, said means comprising a support for said sheet adapted for moving it laterally beneath the pad while in contact therewith, and means for continually supplying abrasive material between the pad and the glass.

RAYMOND C. BENNER.